Feb. 16, 1965

J. R. HORSCH 3,170,146

VOLTAGE DRIVEN MAGNETIC CORE SYSTEM

Filed Feb. 26, 1959

INVENTOR.

JAMES R. HORSCH

BY T. E. Kristofferson

ATTORNEY

United States Patent Office 3,170,146
Patented Feb. 16, 1965

3,170,146

VOLTAGE DRIVEN MAGNETIC CORE SYSTEM

James R. Horsch, North Syracuse, N.Y., assignor to General Electric Company, a corporation of New York Filed Feb. 26, 1959, Ser. No. 795,811
8 Claims. (Cl. 340—174)

Figures 1, 2, 3:
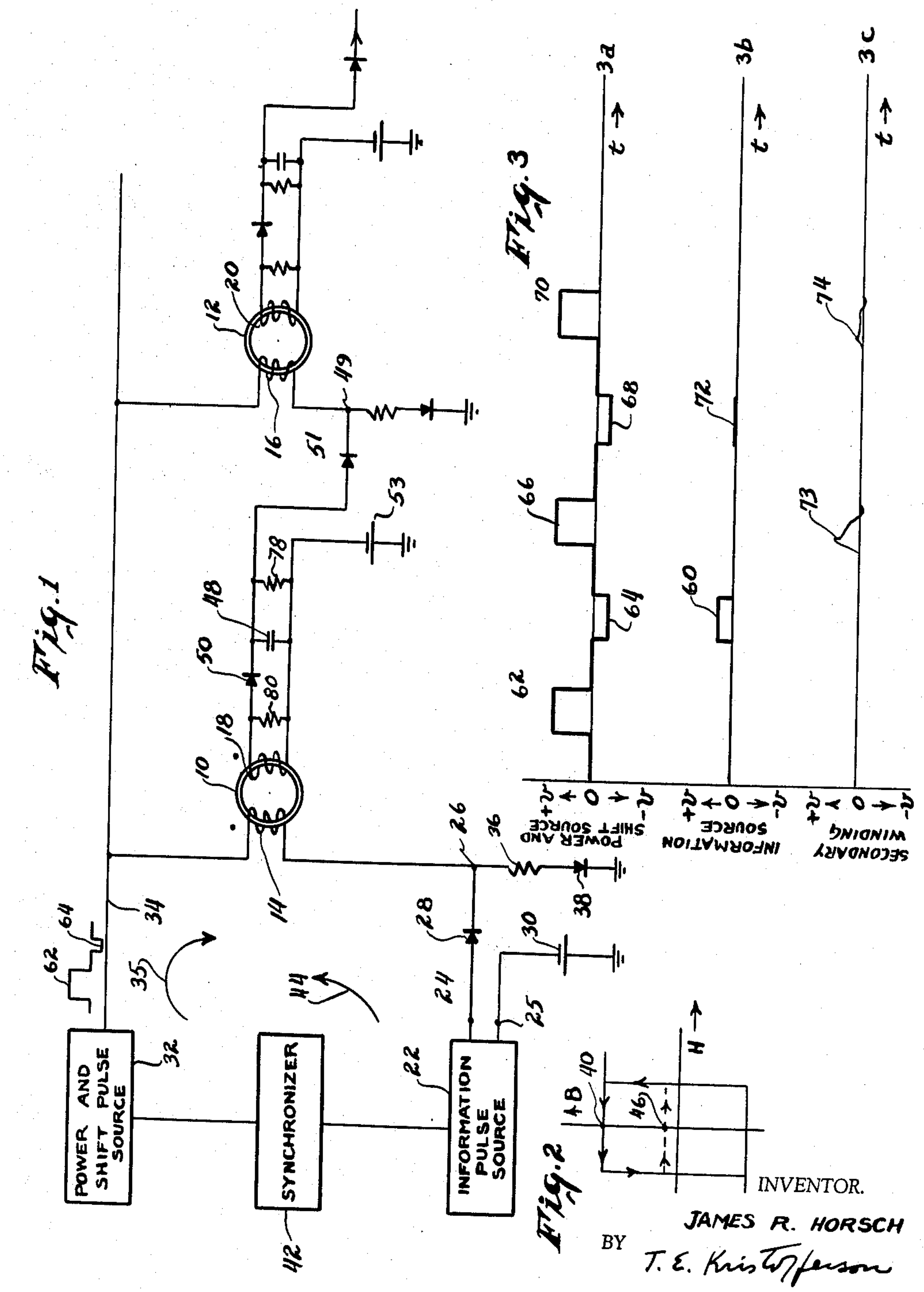

This invention relates to magnetic systems capable of representing binary information by the residual flux density of magnetic elements therein and, more particularly, to such systems useful as shift registers.

Shift registers employing a series of magnetic cores, characterized by a substantially rectangular hysteresis loop, have been employed by the art to receive binary coded messages, store the binary digits in the form of changed magnetic status of the cores, and to shift the messages through successive digit positions in response to a core setting current pulse. Since changes in the magnetic states of saturable cores bear no unique functional relationship to a current pulse through windings on the core, the shift registers employed by the art have been designed to store information in the form of residual saturation flux density, the direction of which is switched to represent the two possible values of a binary digit. Similarly, readout and shifting the message through register digit positions and readout of the message from the register have been controlled by current pulses sufficient to reverse the direction of the residual saturation flux density.

The operation of such systems at the high shift rates dictated by present applications places a severe burden on the current pulse power supply which can be met only with relatively expensive designs. For example, transistors can normally be employed in such sources only with ancillary equipment such as heat sinks which obviate efficient miniature packaging. Excessive core temperature and heat generation within the core are additional problems, since if the core temperature approaches the curie temperature, the properties of the core change.

Attempts to alleviate the restrictions imposed by the power supply have resulted in relatively expensive circuits wherein additional coil windings, additional cores, or additional components such as delay lines are necessary.

Further, power supply limitations have, in general, precluded the use of inexpensive core materials such as ferrites which, although having the advantage of high electrical resistivity as well as a cost advantage, require higher operating power because of higher hysteresis losses.

It is, therefore, one object of my invention to provide a shift register having one magnetic element per bit in which the cores are provided with only two windings per core and in which message transfer to successive digit positions is controlled by voltage pulses.

It is a further object of my invention to provide an improved voltage controlled shift register in which the magnetic elements represent bit information by a controllable magnitude of residual flux density therein.

It is a further object of my invention to provide an improved magnetic system in which only one core per bit is employed and in which intermediate information storage is provided by a capacitor from which information transfer is controlled by a pulse.

In accordance with these objects I have provided a shift register having a plurality of magnetic cores each of which is adapted to represent the two possible values of a binary digit by two distinct reference flux densities therein. A voltage pulse, termed a power pulse, of predetermined amplitude and duration is applied to all cores to set the cores at one reference level, the retentive flux density or positive remanence level. A shift pulse, applied to all cores simultaneously with the application of the digit information pulse to the first core, is a voltage pulse of predetermined amplitude and duration and coacts with the input pulse to set the first core to the proper reference level.

One value of the binary digit, indicated by the absence of a positive input voltage pulse, is represented by the reference level of retentive flux density. To prevent change in the established reference level during the application of such digit information, a bias voltage bucks out the shift pulse.

The other value of the binary digit, indicated by a positive input voltage pulse, is represented by a second reference level of the flux density, a remnant flux density intermediate the positive remanence level and negative remanence level. The remnant flux density is established by decreasing the flux density from the retentive level by a predetermined amount under the influence of the coacting input pulse and the shift pulse. The change to a stable reference level is ensured by regulating the amplitude and duration of the voltage pulse effective in changing the core flux density.

Shift of the digit information to successive digit positions is effected by a secondary winding across which a voltage is generated during the core setting power pulse only if the power pulse changes the reference level. A capacitor is charged by the secondary voltage and serves as the input to a successive core during the following shift pulse.

Further objects and advantages of my invention will be described hereinafter.

A preferred embodiment is illustrated in the accompanying drawing of which:

FIGURE 1 is a schematic diagram of a shift register in accordance with this invention;

FIGURE 2 is a plot of an idealized hysteresis loop associated with the magnetic cores of FIGURE 1 and in which flux density is plotted along the axis of ordinates and coercive force is plotted along the axis of abscissa; and FIGURE 3 represents various operating characteristics of the circuit of FIGURE 1 with voltage plotted along the axis of ordinates against a common scale of time plotted along the axis of abscissa.

Referring to FIGURE 1, there is shown a shift register having magnetic cores 10 and 12. For simplicity only two cores are shown, although additional cores would be connected in similar fashion to handle the requisite number of digits in a binary-coded expression or message.

The magnetic cores may be constructed from various magnetic materials having a substantially square-loop characteristic, formed into a toroid. Tape wound cores of suitable material are satisfactory, but ferrite cores are preferred in many applications because material costs are lower and because the high electrical resistivity does not permit volume eddy currents which occur in metals at high repetition rates.

The cores 10 and 12 are provided with respective primary windings 14 and 16 and secondary windings 18 and 20 wound with the indicated phase relationship. Source 22 generates the input information signal across terminal 24 and 25 thereof. The information signal comprises sequentially generated binary digits having two possible values; one value (1) of which is indicated by positive going electrical pulse; the other value (0) of which is indicated by the absence of such a pulse. The input signal is applied to terminal 26 of the primary winding through the unidirectional conducting device such as a diode 28. The input signal level is biased to the desired level below ground by battery 30.

To reflect the input information the core flux density is changed from one reference level to another. One reference level of core flux density is set at the retentive flux density level, the flux density remaining in the core after the removal of coercive force sufficient to establish saturation flux density in the core. To set the core to this reference level source 32 is provided which generates periodic positive pulses of predetermined amplitude and duration (62, 66 FIGURE 3). This positive pulse, termed a power pulse, is applied to all core primary windings over bus 34. Current, indicated by arrow 35, flows through the serially coupled primary winding, resistor 36, and unidirectional conducting device 38 to ground. The power pulse sets the core to a retentive flux density or positive remanence level, indicated by 40, FIGURE 2, which is the reference level representing one value of stored binary digit information. I have established this reference level as the level corresponding to the zero value of an input binary digit (indicated by the absence of a pulse). The bias voltage 30, coacting with the unidirectional conducting device 28, prevents unplanned change from this reference level.

To represent the "1" value of input binary digit, the core flux is changed to a second reference level, 46 FIGURE 2. The second reference level is the intermediate remnant flux density level, the flux density remaining in the core after the removal of an adequate coercive force applied to a time less than that required to establish reverse flux saturation (negative retentive, flux density).

To control the change from the positive retentive to the intermediate remnant flux density, I provide a coercive force bucking the retentive flux which is derived from a voltage pulse of predetermined amplitude and duration. By controlling the volt-time product (e.g. the integral of voltage over the time applied) the remnant flux density is correspondingly controlled and thus, the advantages of partial looping can be realized.

In order to change the flux density to the intermediate remnant level during a positive input pulse, a negative going pulse (64, FIG. 3) termed a shift pulse is applied to each primary winding over bus 34. The shift pulse is synchronized with the input pulses by synchronizing circuit 42 or by timing pulses if the register is used with a synchronous digital computer.

The amplitude of the shift pulse and the bucking bias voltage 30 are the same. Thus, during a positive information pulse, current flow through primary winding 14 is established in the direction of arrow 44 by the input pulse, the shift pulse voltage being balanced out by the bucking bias voltage.

The current flow will establish a coercive force bucking the retentive flux to set the core to a remnant flux density.

To ensure stability of the intermediate remnant flux density, the volt-time product of the input pulse is controlled. In some applications the amplitude and duration of the information pulses from the information handling equipment are accurately controlled and may be used directly.

In other applications the amplitude and duration of the informative pulses are not controllable in the information handling systems. In these applications the source 22 will include means for pulse control. For example, if the amplitude and duration of the information pulse varies, but the duration always exceeds the desired interval, the source might include a limiter to control the pulse amplitude. The effective duration of the pulse would then be controlled by the duration of the shift pulse. The termination of the shift pulse would cause the bias voltage to overcome the input information pulse, since the bias voltage is maintained at a greater amplitude than the input information pulse. Thus, the unidirectional conducting device 28 would cut off current flow through the primary winding, limiting the effective duration of the flux changing pulse to the duration of the shift pulse.

When variation of both the amplitude and duration of the input pulse is present, the source 22 will include an active element such as a blocking oscillator triggered by the input pulses to produce an output pulse of desired waveform.

It will be noticed that the value of flux density in each core may vary. Control of the volt-time product of the effective voltage pulse is maintained to ensure partial looping and, thus, lower energy loss in the core than that loss associated with switching of flux at the saturation level.

In the absence of a positive input pulse, no current will flow through the primary winding even during the shift pulse, and the core flux density will remain at the retentive level.

Thus, the input binary digit value is reflected in a corresponding flux density state in the first core of the shift register.

To transfer the information stored in the first core to successive digit positions in the register, a storage and transfer network is provided. This network comprises the secondary winding 18 and a storage capacitor 48 coupled across the secondary winding. The phase relationship between the secondary and the primary winding is indicated by the conventional dots.

If core 10 has a remnant flux density, the application of the power pulse will change the flux density to the retentive level. The change in flux results in a voltage generated across the secondary winding 18. The voltage charges capacitor 48. Discharge of the capacitor through the winding subsequently is prevented by the serially connected diode 50. During the next shift pulse the charged capacitor will be the input source for the successive stage, coupled to the primary winding terminal 49 through diode 51. A bias source 53 is provided for same purpose as bias source 30.

When the power pulse does not change the flux density in the core 10, no voltage will be generated across secondary winding 18 and capacitor 48 will remain uncharged.

The diode 50 will prevent charging of the capacitor in the reverse sense during the flux change from the retentive to the remnant flux levels associated with the storage of a "1" binary digit in the core.

OPERATION

The register is first "cleared" by setting all cores to a retentive level 40, FIGURE 2.

The application of the binary digit "1," 60, FIGURE 3 to the register simultaneously with the shift pulse 64 will change the core flux in core 10 to the remnant level 46, FIGURE 2, established by the predetermined volt-time product of the effective pulse. The shift pulse will overcome the bias voltage of source 30 and conduction caused by the voltage of the information pulse will take place through the diode 28 and primary winding 14 in the direction of arrow 44. Resistor 36 is large with respect to the resistance of the primary winding and current flow therethrough is not significant. Diode 50 prevents charging of capacitor 48 during the flux density change.

Core 12 remains at the retentive flux density 40, FIGURE 3, since no coercive force is applied.

The subsequent power pulse 66, FIGURE 3, resets core 10 to the retentive flux density. The change in flux through the core will generate a voltage 73, FIGURE 3 across the secondary winding 18 which charges capacitor 48. Discharge of the capacitor through the primary of core 12 is prevented by the coaction of the bias 53 and the diode 51.

The subsequent shift pulse 68 will, however, overcome the bias 53 and the capacitor 48 will discharge through the primary of core 12 to set the flux level to the intermediate remnant value. The remnant level in core 12 is fixed at the different level than that of core 10, since the change in flux in core 10 which results in charging the capacitor produces a lesser change in flux in core 12 on discharge on an equal turns basis. Losses may be disregarded at normal operating frequencies and the time constant of the capacitor and primary circuit can be adjusted to fully discharge the capacitor during the shift pulse. In this manner the binary digit "1" is transferred from core to core. It must be observed that in a multi-stage register, all stages, except the first stage, cycle between the same value of remnant and retentive flux values, while the first stage will cycle through a controllably larger flux differential, since the first stage is driven by a rectangular pulse while subsequent stages are driven by a capacitor discharge.

During the shift pulse 68 the binary digit "0" 72 is applied by source 22, FIGURE 1. Since this pulse is of zero amplitude, core 10 will remain at the retentive level. If the cores were of ideal magnetic characteristics, no charge would be applied to capacitor 48 on the application of the subsequent power pulse 70. However, in practice the hysteresis loop of the material will deviate from the ideal rectangular form and a spurious voltage 74, FIGURE 3 will be generated. To prevent build up of charge on capacitor 48 by series of such spurious voltages, a bleeder resistor 78 is coupled across the capacitor. The resistor will prevent charge accumulation over many cycles without interference with charge retention over a single cycle.

In some cases the rise time of the power pulse will be extremely short and ringing might occur. A resistor 80 coupled across the secondary damps such oscillations.

Thus, a circuit is provided in which the bit information is represented by flux levels in the magnetic elements. Change of flux level, transfer of represented information to intermediate storage elements, and transfer of represented information to subsequent cores is controlled by voltage pulses, the amplitude and duration of which is easily regulated by generators known to the art, such as transistor oscillators or multivibrators. Since the cores are driven over only a portion of the full hysteresis loop ("partial looping"), the power dissipated therein is greatly reduced at higher operating rates. I have found that this circuit may be operated with shift rates as high as 500,000 cycles per second and have operated the circuit with pulse widths corresponding to a 1 megacycle per second shift rate, indicating that a 1 megacycle shift rate is feasible.

As example of typical component characteristics and value is set forth in Table I.

*Table I*

| Item | Characteristic |
|---|---|
| Register | 5-stage. |
| Repetition rate | 300,000 c.p.s. |
| Core: | |
| Material | Ferrite. |
| OD | .230". |
| ID | .109". |
| Height | .062". |
| Thickness | .061". |
| Resistor 36, Fig. 1 | 500 ohms. |
| Primary turns | 100. |
| Secondary turns | 500. |
| Diode 28, Fig. 1 | T76. |
| Diode 50, Fig. 1 | T76. |
| Diode 38, Fig. 1 | Hughes 2510. |
| Power Pulse | 40 v., 1.5 $\mu$sec. width. |
| Shift Pulse | 20 v., 1.5 $\mu$sec. width. |
| Power-shift pulse separation w/o deterioration of output | 0.1 $\mu$s. |
| Core Switching time | .75 $\mu$s. |
| Output "1" /output "0" (volts across capacitive load) | 10:1. |

If the application so dictates, the circuit may, of course, be modified to utilize waveforms having a different bias level. For example, the ground levels indicated in connection with the shift register may be tied to a bias of required magnitude if the zero axis of the power and the shift pulse source is biased to the same value.

The separation of the power and shift pulses depends upon the reverse recovery characteristics of diode 50. If the separation is reduced below the reverse recovery time of diode 50, some charge leakage from capacitor 48 will occur and signal degradation might result. Thus, signal separation is required if the cores are to be operated over a minimum path (smallest partial loop).

What is claimed is:

1. A shift register comprising a plurality of magnetic cores, means responsive to a voltage pulse of predetermined waveform to set all said cores to a positive retentive flux density, means responsive to an input signal of predetermined amplitude to set one of said cores to an intermediate remnant flux density, storage means responsive to a change in core flux from the intermediate remnant to positive retentive level only to develop a stored signal, said storage means operatively coupled between successive cores, means responsive to a stored signal of predetermined amplitude to set another of said cores to an intermediate remnant flux density.

2. In a shift register having magnetic elements, means for changing the magnitude of flux density of said elements to represent the state of a binary bit, means for periodically resetting the core to a predetermined flux density other than the positive retentive or negative remnant flux density including a voltage pulse of predetermined amplitude and duration, an intermediate storage element, means responsive to flux change during core resetting for applying a voltage to said storage element, and means including a shift pulse of predetermined amplitude for periodically discharging said storage elements.

3. A magnetic system comprising a magnetic core made of a material capable of being driven from a positive retentive flux density to a negative remnant flux density, means for setting said core to said retentive flux density, and means responsive to an input information bit to set said core to a flux density intermediate said retentive flux density and said remnant flux density, said last named means including means for simultaneously generating a shift voltage pulse and an input pulse of predetermined amplitude.

4. A magnetic system comprising a magnetic element capable of being driven between a positive retentive and a remnant flux density other than the negative remnant flux density, inductance means on said element, means for periodically at a first time interval applying a voltage pulse to said inductance means to set said element to said retentive flux density level, a source of information pulses, gating means for periodically at a second time interval coupling said information pulses to said inductance means, said information pulses having a voltage time product so as to set said element to said remnant flux density level, said gating means comprising a source of biasing potential connected to normally block the application of said information pulses to said inductance means, and a source of periodic shift pulses having an amplitude so as to balance out said biasing potential.

5. A magnetic system in accordance with claim 4 in which said shift pulses are synchronized in time with said information pulses.

6. A shift register circuit comprising a plurality of magnetic elements, a primary and secondary winding on each of said elements, a source of periodically applied voltage pulses coupled across each of said primary windings, said voltage pulses having a predetermined amplitude and duration to set said elements to a positive retentive flux density, an input signal source, gating means for coupling the input signal to the primary winding of one of said elements, said input signal having a voltage time product so as to set said one element to a remnant flux density other than the negative remnant flux density, a plurality of output circuits, one of said output circuits being connected between the secondary winding of a preceding magnetic element and the primary winding of a successive magnetic element, each of said output circuits including voltage storage means connected so as to be charged responsive to a flux change of the preceding element in only one predetermined direction, shift pulse means for actuating said gating means and for coupling the voltage charged on said storage means to the primary winding of the successive element.

7. A shift register circuit comprising a plurality of magnetic elements, a primary and secondary winding on each of said elements, a source of voltage pulses periodically applied at a first time interval across each of said primary windings, said voltage pulses having a predetermined amplitude and duration to set said cores to a positive retentive flux density, a source of input signals, a first gating means periodically at a second time interval coupling said input signals to the primary winding of a first one of said elements, said input signals having a voltage time product so as to set said element to a remnant flux density other than the negative remnant flux density, a plurality of output circuits, each of said output circuits being coupled from the secondary winding of a preceding element to the input winding of a successive element, each of said output circuits comprising second gating means, and voltage storage means connected so as to be charged responsive to a change in core flux from the remnant to retentive level in the preceding element, said second gating means periodically at said second time interval coupling the voltage on said storage means to the primary winding of the successive element.

8. The shift register circuit in accordance with claim 5 in which said first and second gating means are actuated by periodically applied shift pulses synchronized in time with said input signals.

References Cited by the Examiner

UNITED STATES PATENTS

| | | | |
|---|---|---|---|
| 2,776,420 | 10/56 | Ramey | 307—88 X |
| 2,808,578 | 10/57 | Goodell et al. | 340—174 |
| 2,873,438 | 2/58 | Bieganski | 340—174 |
| 2,876,438 | 3/59 | Jones | 340—174 |
| 2,888,667 | 5/59 | Schmitt | 340—174 |
| 2,968,796 | 1/61 | Lane | 340—174 |
| 3,027,547 | 3/62 | Froehlich | 340—174 |
| 3,029,415 | 4/62 | Baldwin | 340—174 |

IRVING L. SRAGOW, *Primary Examiner.*

WALTER W. BURNS, Jr., EVERETT R. REYNOLDS, *Examiners.*